TRANSISTOR SERVOMOTOR DRIVE CIRCUIT

Filed July 10, 1961 2 Sheets-Sheet 1

INVENTORS
BENJAMIN B. BIDERMAN
CHARLES O. FEIGLESON
BY
Moody and Kintzinger
ATTORNEYS INVENTORS
BENJAMIN B. BIDERMAN
CHARLES O. FEIGLESON
BY
Woody and Kintzinger
ATTORNEYS

United States Patent Office 3,155,890
Patented Nov. 3, 1964

3,155,890
TRANSISTOR SERVOMOTOR DRIVE CIRCUIT
Benjamin B. Biderman and Charles O. Feigleson, Cedar Rapids, Iowa, assignors to Collins Radio Company, Cedar Rapids, Iowa, a corporation of Iowa
Filed July 10, 1961, Ser. No. 123,002
8 Claims. (Cl. 318—29)

Figure 1:
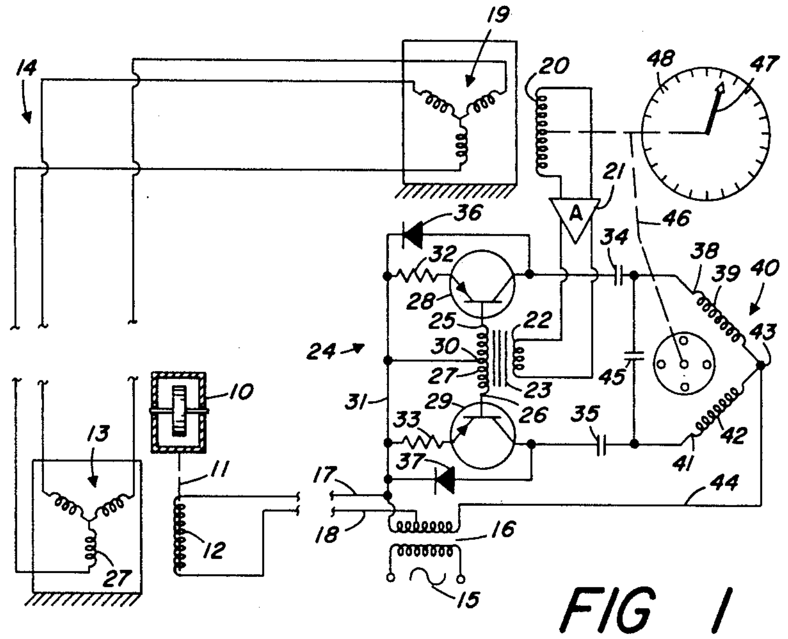

This invention relates in general to servomotor drive circuits and in particular to a transistorized servomotor drive circuit that draws motor drive power only when a servo correction is needed.

Many problems, including the problem of power consumption, may be expected when adapting servo positioning and servomotor drive systems for various applications. Of course, these vary between applications but, space, weight, packaging, maintenance and heat dissipation may also be among the problems to be expected. Heating, as for example with systems drawing continuous motor drive power, may be such as to require special heat sink capacity or other special cooling arrangements for holding ambient temperature down. Such cooling requirements may, incidentally, compound other problems set forth above. Obviously some existing systems are eliminated from consideration for applications where economy and, in many cases, weight are decisive factors.

It is, therefore, a principal object of this invention to provide a servomotor drive system wherein the motor consumes power only when a servo error signal indicates that servo correction is needed.

Another object is to provide a reliable servo drive system utilizing a minimum number of components which are relatively inexpensive, highly reliable and durable.

Features of the invention, useful in accomplishing the above objects, include a transistorized servomotor drive circuit utilizing two diodes and two transistors for two switch controls each of which may be individually activated in applying power for proper directional drive. Either transistor may be biased for conduction in a switch like action upon the appropriate control voltage signal being applied. With this arrangement motor drive power is provided only when a corrective signal occurs and the servo system is not at null. The invention also eliminates the requirement for such components as an output transformer or saturable reactor, and actually requires fewer transistors than a bridge connected servo drive. This results in a smaller and lighter unit, more conveniently packaged and maintained, and which uses less power.

Specific embodiments representing what are presently regarded as the best modes of carrying out the invention are illustrated in the accompanying drawings.

Figure 2:
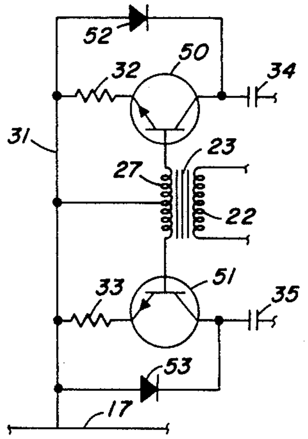
Figure 5:
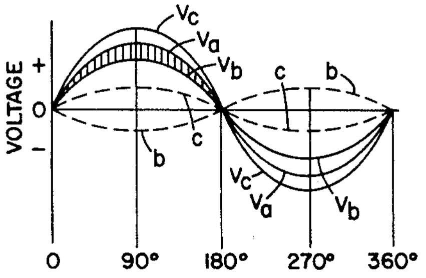
Figure 3:
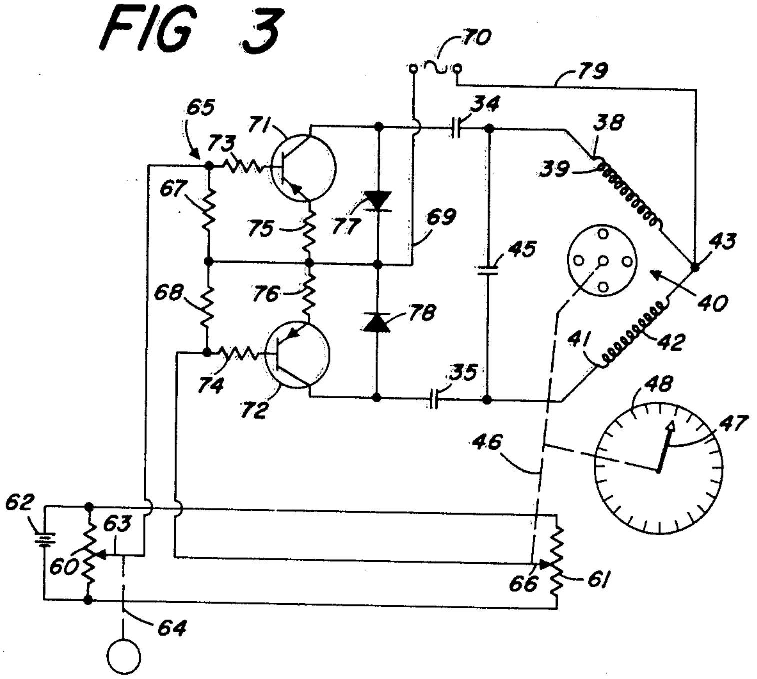
Figure 4:
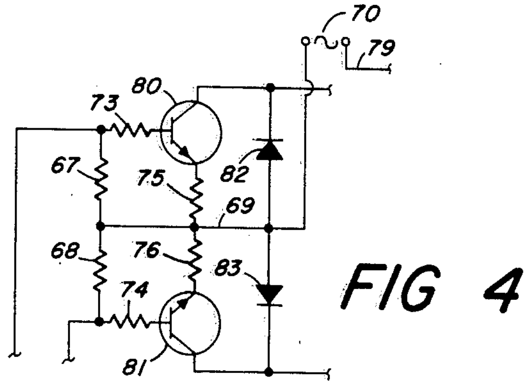

In the drawings:

FIGURE 1 represents a schematic view of a servo system utilizing the transistor controlled servomotor drive circuit of this invention;

FIGURE 2, a partial schematic view of a servo system with NPN transistors replacing the PNP transistors of FIGURE 1 and with the diodes reversed;

FIGURE 3, a schematic view of a servo system adapted for application of D.C. developed biasing voltages between transistor bases and emitters for servo control;

FIGURE 4, a partial schematic view of a servo system similar to FIGURE 3 with NPN transistors and with the diodes reversed; and FIGURE 5, a set of curves showing the voltage wave forms at various points in the circuit.

Referring to the drawings:

The servo system of FIGURE 1 utilizes an input supplied by a remotely positioned directional gyro to position a course indicator and, in doing so, utilizes an improved power conserving drive system which eliminates the consumption of driving power whenever the servo mechanism is in a null state.

Directional gyro 10 provides the command drive through drive train 11 to the movable signal input rotor 12 of synchro transmitter 13 of synchro section 14. The input rotor 12 is energized by the same A.C. power source 15 which also supplies drive power for the servo system. Power is fed to transformer 16, and from the secondary winding A.C. voltage is applied through line 17 and secondary tap line 18 to rotor 12. The induced signal in the Y stator of synchro transmitter 13 is transmitted to the corresponding synchro Y stator in the receiver 19 of synchro section 14. Whenever the position of rotor 20 relative to the Y stator of receiver 19 duplicates the position of rotor 12 relative to the Y stator of transformer 13, a null condition exists with only noise, if anything, being fed from rotor 20 to amplifier 21. However, whenever rotor 20 is in a different position relative to the Y stator of receiver 19 than the position of rotor 12 relative to the Y stator of synchro transmitter 13, a signal is induced in rotor 20. This induced signal will be substantially in phase or 180° out of phase with the A.C. signal fed to rotor 12 depending on the relative positions of rotors 12 and 20.

Voltage induced in rotor 20 is amplified by amplifier 21 and applied to the primary winding 22 of transformer 23. This transformer 23 is a part of the transistor and diode network, generally indicated by the number 24. Terminals 25 and 26 of the secondary winding 27 of transformer 23 are connected to bases of PNP transistors 28 and 29, respectively. A center tap 30 of the secondary winding 27 is connected to the line 31, which is, in turn connected to supply line 17.

The emitters of transistors 28 and 29 are connected to the line 31 through current limiting resistors 32 and 33, respectively. The collectors of the transistors are connected to first sides of capacitors 34 and 35, respectively. Diodes 36 and 37 are connected between line 31 and the first sides of capacitors 34 and 35, respectively. Diodes 36 and 37 are connected so as to allow current to flow toward line 31 from the capacitors 34 and 35 and to provide a bypass for such current flow around the transistors 28 and 29.

The collector of transistor 28 and one side of diode 36 are connected through capacitor 34 to end terminal 38 of stator winding 39 of servomotor 40. The collector of transistor 29 and one side of diode 37 are connected through capacitor 35 to end terminal 41 of stator winding 42. Terminal 43, which is connected by line 44 to one side of the secondary of power input transformer 16, is a common terminal for stator windings 39 and 42. These windings are spaced substantially 90° electrically from each other. Capacitor 45 is connected between stator winding terminals 38 and 41 in the standard manner for two phase motors. The voltages impressed upon each of the stator windings of motor 40 are approximately 90° out of phase. Servomotor 40 acting through drive train 46 servo drives rotor 20 and simultaneously drives the indicating needle 47 of dial 48.

There are three conditions of operation. One is when neither transistor 28 nor 29 are conducting. Another is when one of the transistors is conducting and motor 40 drives rotor 20 in one direction. The third is when the other of the two transistors is conducting for motor drive in the opposite direction.

Consider first the condition of operation, for the embodiment of FIGURE 1, when rotor 20 is in a null position and neither transistor is conducting. Capacitors 34 and 35 become charged by current passing through diodes 36 and 37, respectively, during the first half of the negative half cycle of the voltage across the secondary of the transformer 16. Capacitors 34 and 35 are thereafter maintained at peak charge, for the A.C. power supplied, as long as transistors 28 and 29 remain in a nonconductive state. The polarity of such a charge on capacitors 34 and 35 is as represented by positive plates connected to the motor windings and negative plates connected to the diodes and transistors.

Consider now the condition of operation with synchro rotor 20 no longer in a null position and transistor 28 conducting. For this condition of operation the voltage induced in rotor 20 is amplified and applied to transformer 23 for inducing an A.C. voltage in secondary winding 27. This voltage induced in winding 27 imparts voltage components to secondary winding terminals 25 and 26 as represented by curves *b* and *c*, respectively, of FIGURE 5. The voltage component *b* imparted to terminal 25 is 180° out fo phase with the A.C. voltage $V_a$ applied to line 31. The resultant voltage $V_b$ imparted to terminal 25 (the resultant of voltage $V_a$ and voltage component *b*) is relatively negative to the voltage $V_a$ applied to line 31 and to substantially the same voltage of the emitter of transistor 28 during the positive half cycle of the voltage across the secondary of the transformer 16. This gives transistor 28 a proper bias for conduction as represented by the shaded area in FIGURE 5. The resultant voltage $V_c$ imparted to terminal 26 (the additive resultant of voltage $V_a$ and the voltage components *c*) is relatively positive to the voltage $V_a$ applied to line 31. While transistor 28 is conducting during the positive half cycle of the voltage across the secondary of the transformer 16 capacitor 34 is permitted to discharge through motor winding 39. At the same time transistor 29 remains in a nonconductive state since the biasing voltage applied, with voltage $V_c$ of the transformer terminal 26 at the base and the relatively negative voltage $V_a$ of line 31 and of the emitter, is at cutoff.

During the negative half cycle of the voltage across the secondary of the transformer 16 lines 17 and 31 are negative and line 44 is positive. Simultaneously the voltage $V_b$ applied to the base of transistor 28 is positive relative to the voltage $V_a$ of line 31 while the voltage $V_c$ applied to the base of transistor 29 is relatively negative. It follows that, since capacitor 34 has been discharged, diode 36 will then conduct to recharge the capacitor and current will flow through motor winding 39 as capacitor 34 is charging for this particular half cycle. Capacitor 35, on the other hand, is not affected since it has remained in a continuously charged state. This operational cycle is continuous as long as the servo corrective signal supplied through amplifier 21 from rotor 20 continues to induce a voltage of the same phase in secondary winding 27.

During each recharging cycle of the capacitor 34, current flows directly through motor winding 39. With this current flow and the action of capacitor 45 along with successive charges and discharges of capacitor 34, a leading current, shifted in phase by approximately 90°, will flow through motor winding 42. Currents flow through the two motor windings and result in a rotating field and torque in motor 40 for rotating drive train 46 in one direction. This returns rotor 20 to a null position and simultaneously sets the indicating needle 47 of dial 48.

Rotor 12 may be so turned that a signal induced in rotor 20 and fed to transformer 23 produces an induced voltage in winding 27 which imparts to terminal 25 an A.C. voltage in phase with the A.C. voltage of line 31. This results in operation substantially the same as described above except that transistor 29 is repeatedly biased for conduction while transistor 28 remains nonconductive. In referring to FIGURE 5 for this operation curve $V_a$ would again represent the A.C. voltage of line 31. However, curve *b* would represent the voltage component imparted to terminal 26 and curve *c* would represent the voltage component imparted to terminal 25. Curves $V_b$ and $V_c$ are also reversed with $V_b$ representing the actual resultant voltage imparted to terminal 26 and $V_c$ representing the actual resultant voltage imparted to terminal 25. With this action capacitor 35 is charged and discharged with each A.C. cycle, while capacitor 34 remains charged, and the motor output drive train 46 will turn in the opposite direction.

In the embodiment of FIGURE 2, wherein the PNP transistors 28 and 29 of FIGURE 1 are replaced by NPN transistors 50 and 51, similar components performing substantially the same functions are, for the sake of convenience, numbered the same. Diodes 52 and 53 are connected between line 31 and the first sides of capacitors 34 and 35, respectively. The diodes 36 and 37 are so connected as to allow current to flow toward the capacitors 34 and 35 from line 31. Such current flow may charge capacitors 34 and 35 so that the plates connected to the motor windings 39 and 42 are negative which is reverse to the polarity of the system of FIGURE 1.

Operation is substantially the same as in the embodiment of FIGURE 1 with one or the other of the capacitors being charged and discharged for operation of the motor in the respective direction as the associated transistor is voltage biased to conductive. Here, of course, the signal from amplifier 21 causes conduction in one of the transistors 50 or 51 when the base is positive relative to the emitter.

FIGURE 3 shows a servo mechanism wherein a D.C. control is used. Two resistors 60 and 61 are connected in a bridge circuit and are biased by a constant D.C. voltage source such as battery 62. A voltage position sensing tap 63, which is moved along resistor 60 by input drive 64, applies a position indicating D.C. input voltage to the resistor-transistor network generally indicated by the number 65. A movable tap 66 which may be servo positioned by servomotor 40, acting through drive train 46, applies a servo system feedback D.C. voltage as an input to the resistor-transistor network 65.

The D.C. servo control includes resistors 67 and 68 which are series connected between resistor tap 63 and resistor tap 66 for use in deriving D.C. developed voltages in resistor-transistor network 65. Resistor tap 63 is also connected to the base of PNP transistor 71 through resistor 73, and resistor tap 66 is also connected to the base of PNP transistor 72 through resistor 74. Line 69 from A.C. voltage source 70 is connected to the common junction of resistors 67 and 68, and to the emitters of transistors 71 and 72 through current limiting resistors 75 and 76, respectively. The collector of transistor 71 is connected to capacitor 34 and also to A.C. voltage line 69 through diode 77. The collector of transistor 71 is connected to capacitor 35 and also to A.C. voltage line 69 through diode 78. The other A.C. voltage line 79 connects the A.C. voltage source 70 to the terminal 43 of servomotor 40. In this embodiment, similar components performing substantially the same functions as in the other embodiments are also, for the sake of convenience, numbered the same.

In operation of the FIGURE 3 embodiment capacitors 34 and 35 will both become charged by the current passing through diodes 77 and 78, respectively, during the portion of each A.C. cycle that line 69 is negative with respect to line 79. The current flow in charging capacitors 34 and 35 quickly diminishes to a negligible quantity as the capacitors come to peak charge, particularly during the times when both transistors 71 and 72 are in a nonconductive state. The polarity of such a charge on capacitors 34 and 35 is represented by the positive plates thereof connected to the motor windings and the negative plates thereof connected to the diodes and transistors.

When the voltage being applied to the base of the transistor 71 or 72 is relatively negative to the voltage potential of line 69, the respective transistor may be biased to conduction. Such a bias being applied between the emitter and base of a transistor is developed by the current flow through resistors 67 and 68 whenever taps 63 and 66 are at different voltage potential settings on their respective resistors 60 and 61. In this system should tap 63 be at a sufficiently lower D.C. voltage potential than tap 66, the biasing voltage developed will be such as to bias transistor 71 to a state of conduction. On the other hand, should resistor tap 63 be so positioned that its D.C. voltage potential is sufficiently higher than that of resistor tap 66, then transistor 72 would be biased to the conductive state.

The FIGURE 3 embodiment involves a further innovation in operation from the embodiments of FIGURES 1 and 2 in addition to the D.C. method of applying biasing voltages to the transistors. This further difference lies in the charging and discharging action of the capacitor 34 or 35 when the transistor 71 or 72 is biased to a state of conduction. The respective transistor 71 or 72 voltage biased to a state of conduction remains biased positive emitter to relatively negative base through repeated A.C. supply voltage cycles continuously as long as that respective servo correction D.C. derived biasing voltage is applied. This continues for so long as it takes motor 40, acting through drive train 46, to drive resistor tap 66 to a null position where the voltage potential of tap 66 is substantially equal to the voltage potential of tap 63.

In the embodiment of FIGURE 4, wherein PNP transistors 71 and 72 of FIGURE 3 are replaced by NPN transistors 80 and 81, similar components performing substantially the same function, are for the sake of convenience, numbered the same. Diodes 82 and 83 are connected so as to allow current flow toward the capacitors 34 and 35 from line 69. Such current flow may charge capacitors 34 and 35 with excessive electrons on the plates connected to the motor windings 39 and 42, in effect reverse polarity from the system of FIGURE 3. Here, of course, the cycle of operation would be opposite from that set forth with respect to the FIGURE 3 embodiment just as the operation of the FIGURE 2 embodiment varies from the operation of the FIGURE 1 embodiment.

Whereas this invention is here illustrated and described with respect to several specific embodiments thereof, it should be realized that various changes may be made without departing from the essential contributions to the art made by the teachings hereof.

We claim:

1. A drive control system for a motor having two stator windings joined at a common terminal and having two outer end terminals, comprising; a first capacitor connected to one of said outer end terminals, a second capacitor connected to the other of said outer end terminals, and a third capacitor connected directly between a terminal of said first capacitor and a terminal of said second capacitor; a first transistor and a second transistor each having an emitter, a base and a collector and with the collectors thereof connected to the said first and second capacitors, respectively; an A.C. voltage source having a first lead connected to the common terminal of said motor windings and having a second lead connected to the emitters of said first and second transistors; a first diode and a second diode connected between said second A.C. voltage lead and said first and second capacitors, respectively; said first and second diodes being arranged for passing current when forwardly biased in one direction relative to said second A.C. voltage lead; said first and second transistors being arranged for passing current in the opposite direction from the current passing direction of said first and second diodes when the respective transistor is biased to conduction; an element movably mounted for movement to multiple positions; and means responsive to movement of said element for selectively biasing one of said transistors to conduction for directional drive control of said motor.

2. The drive control system of claim 1, wherein said first and second transistors are PNP transistors, and said first and second diodes are connected for passing current when forwardly biased from said first and second capacitors, respectively, to said second A.C. voltage lead.

3. The drive control system of claim 1, wherein said first and second transistors are NPN transistors, and said first and second diodes are connected for passing current when forwardly biased from said second A.C. voltage lead to said first and second capacitors, respectively.

4. A servo system having a command element movably mounted for movement to multiple positions, a servomotor with two stator windings having a common terminal and having two outer end terminals, and a servomotor drive control system, comprising; a first capacitor connected to one of said outer end terminals, a second capacitor connected to the other of said outer end terminals, and a third capacitor connected directly between a terminal of said first capacitor and a terminal of said second capacitor; a first transistor and a second transistor each having an emitter, a base, and a collector, and with the collectors thereof connected to the said first and second capacitors, respectively; an A.C. voltage source having a first lead connected to the common terminal of said motor windings and having a second lead connected to the emitters of said first and second transistors; a first diode and a second diode connected between said second A.C. voltage lead and said first and second capacitors, respectively; said first and second diodes being arranged for passing current when forwardly biased in one direction relative to said second A.C. voltage lead; said first and second transistors being arranged for passing current in the opposite direction from the current passing direction of said first and second diodes when the respective transistor is biased to conduction; and means responsive to movement of said element for selectively biasing said transistors by application of a bias to one of the transistors for directional drive control of said motor.

5. The servo system of claim 4, wherein the servo system includes; a synchro section having a synchro transmitter with a movably mounted input rotor, and having a synchro receiver with an output rotor; a transformer connected to said output rotor, said transformer being provided with a secondary winding with end terminals connected to the bases of said first and second transistors, respectively, and having a center tap connected to said second A.C. voltage lead; means for applying an A.C. voltage to said input rotor of the synchro transmitter and for applying this A.C. voltage in phased relation to the voltage of said A.C. voltage source; and a drive train connecting said servomotor to said output rotor of the synchro receiver.

6. The servo system of claim 4, wherein a first resistor and a second resistor are biased by a single D.C. voltage source, said first and second resistors being each provided with a movable tap; the taps of said first and second resistors being connected to the bases of said transistors, respectively; third and fourth resistors being series connected between said taps; said second A.C. voltage lead being connected to the junction of said third and fourth resistors; and a drive train connecting said servomotor to the movable tap of said second resistor.

7. A drive control system for a motor having multiple stator windings and having an associated network of capacitors connected to said multiple stator windings, comprising; an A.C. voltage source having a first lead connected directly to the said multiple stator windings, and having a second lead; a first transistor and a first diode connected between said second lead and a first point of said capacitor network; a second transistor and a second diode connected between said second lead and a second point of said capacitor network, control means for selectively individually biasing said first and second transistors to conduction; said first transistor and said first diode, and said second transistor and said second diode being arranged to permit current flow to and from the said first point and said second point, respectively, when the respective transistor is biased to a state of conduction; and said capacitor network being so arranged that, during application of A.C. power and while one of said transistors is biased to a state of conduction, current will flow directly through one of said multiple windings and a leading current will flow through another of said multiple windings and when neither transistor is biased to a state of conduction current flow is blocked from said multiple stator windings.

8. The drive control system of claim 1, wherein said third capacitor is connected between the junction of said first capacitor and one of said outer end terminals and the junction of said second capacitor and the other outer end terminal.

References Cited in the file of this patent

UNITED STATES PATENTS

| | | |
|---|---|---|
| 2,664,533 | Raab | Dec. 20, 1953 |
| 2,914,717 | Redding | Nov. 24, 1959 |
| 2,959,720 | Shemanske | Nov. 8, 1960 |